Oct. 16, 1956   F. O. EHRLER ET AL   2,766,630
INDICATOR ACTUATOR
Filed Dec. 21, 1953
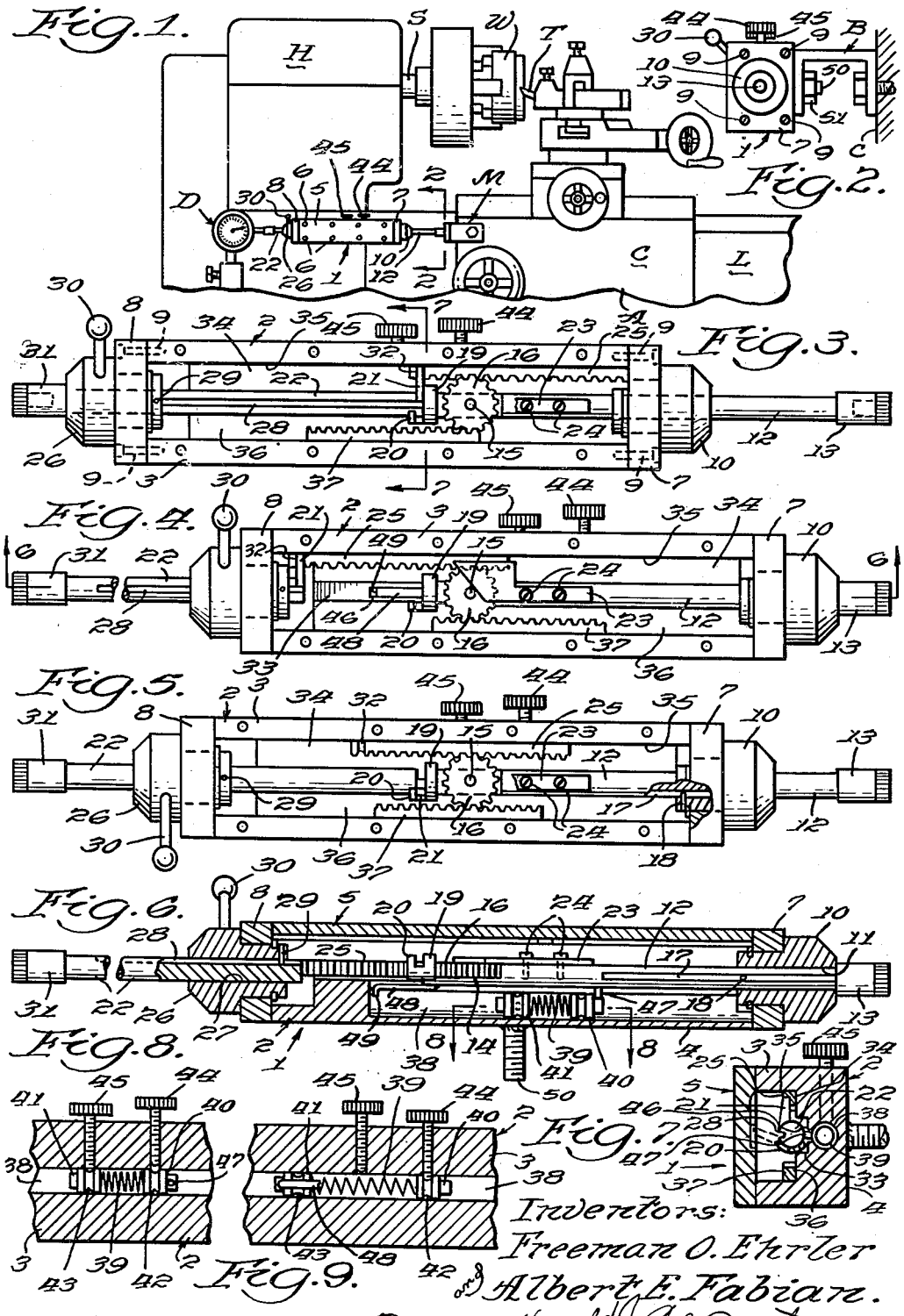

United States Patent Office 2,766,630
Patented Oct. 16, 1956

2,766,630

INDICATOR ACTUATOR

Freeman O. Ehrler, North Hollywood, and Albert E. Fabian, Inglewood, Calif.

Application December 21, 1953, Serial No. 399,486

9 Claims. (Cl. 74—110)

This invention relates to machine tool accessories and more particularly to an operator for a dial indicator to facilitate accurate machining operations.

The principal object of the invention is to provide an operator for dial indicators which is so constructed that the spring bias therein may be readily reversed and in which the movement in either direction may be either 1:1, 1:2, or 2:1 as desired.

Another object of the invention is to provide an operator for dial indicators having the above desirable characteristics which is so constructed and arranged as to be readily mounted on machine tools in combination with a dial indicator to enable the relative movement of two parts of the machine to be measured with accuracy.

A further object of the invention is to provide an operator for a dial indicator which is simple and sturdy in construction, is readily adjusted for the desired mode of operation, and which is reliable in use.

With the foregoing objects in view, together with such additional objects and advantages as may subsequently appear, the invention resides in the parts, and in the construction, combination and arrangement of parts, disclosed by way of example in the following specification of one mode of execution of the invention; reference being had to the accompanying drawings which form a part of said specification and in which drawings:

Fig. 1 is a front elevation of a portion of a lathe showing a dial indicator positioned to indicate movement of the carriage toward the headstock and an operator for the dial indicator embodying the present invention interposed between the carriage and the indicator, Fig. 2 is an enlarged end elevation shown in Fig. 1, the view being taken on the line 2—2 of Fig. 1, Fig. 3 is a further enlarged front elevation of the operator shown in Fig. 1 with the cover plate removed and arranged for spring biased movement to the right hand end as viewed, for 1:2 movements between the right and left hand components thereof and at the extreme of movement derived from the existing spring bias, Fig. 4 is a view similar to Fig. 3, but showing the relative positions of the parts at the opposite extreme of movement in opposition to the spring bias, Fig. 5 is another view similar to Fig. 3 with the spring bias in the same direction, but showing the parts arranged for 1:1 relative movement and in mid-travel position, Fig. 6 is a medial longitudinal view taken on the line 6—6 of Fig. 4, Fig. 7 is a transverse sectional view taken on the line 7—7 of Fig. 3, Fig. 8 is a fragmentary sectional view taken on the line 8—8 of Fig. 6 showing the position of the actuating spring when fully compressed, and Fig. 9 is a view similar to Fig. 8, but showing the mode of reversing the direction of the spring bias.

Referring first to Figs. 1 and 2, there is shown a lathe having the illustrated embodiment of the invention applied thereto; said lathe including a bed L on which is mounted a carriage C supporting a tool T engaging a work piece W held in a chuck carried by a rotatable spindle S in the headstock H of the lathe. The lathe also has mounted thereon a dial indicator D located in line with the path of movement of the apron A of the lathe carriage and the lathe bed L below the headstock carries a bracket B disposed between the carriage and the dial indicator on which the indicator operator 1 is mounted. Additionally, the carriage apron A carries a detachable lug member M adapted to engage the indicator operator as will later be explained in detail.

The indicator operator of the invention, in the embodiment thereof, shown in Figs. 3 to 9, inclusive, comprises an elongated case 2 of rectangular cross section including a hollow base member 3 exteriorly forming the back 4 and two sides of the case, a cover member 5 secured to the base member by screws 6, and end members 7 and 8 secured to the opposite ends of the base member 3 by screws 9. Fixedly mounted in and extending through the end member 7 is a bushing 10 having a bore 11 extending therethrough parallel to the length of the case and opening into the hollow interior of the case. A rod 12 is slidably mounted in the bore 11 and extends from a head portion 13 slightly larger than the bore 11 exteriorly of the bushing to a flattened portion 14 within the case carrying a stud 15 on which a pinion 16 is freely mounted. Additionally, the portion of the rod 12 which engages the interior of the bushing 10 incident to reciprocation therein is provided with a longitudinal groove 17 engaged by a pin 18 carried by the bushing 10 to prevent turning of the rod in the bushing. Beyond the pinion 16 the rod 12 terminates in a head portion 19 having finger portion 20 at the outer end thereof extending first outwardly from the end of the head 19 and thence parallel with the face of the end of the head 19 with resultant formation of a notch into which a finger 21 carried by the opposite rod 22 may be moved as will presently be described in detail. The rod 12 within the case and adjacent to the pinion 16 carries a leaf element 23 fixed to the rod 12 by screws 24 and overlying a portion of the pinion 16 to serve to maintain the pinion on the stud 15. Additionally, the leaf element extends laterally of the pinion to overlie a reciprocable rack 25 meshing with the pinion 16 and to which detailed reference will hereinafter be made.

The end member 8 carries a bushing 26 rotatably mounted therein; said bushing having a bore 27 in axial alignment with the bore 11 and coaxially disposed with respect to the exterior surface of the bushing mounted in the end member 8 and in which bore the rod 22 is mounted for reciprocation. The rod 22 is provided with a longitudinal groove 28 engaging a pin 29 carried by the bushing 27 effective to restrain the rod 22 from rotation in the bushing while permitting the said reciprocation, and exteriorly of the end member 8, the bushing carries a laterally extending handle 30 by which the bushing and rod may be rotated about the axis of the rod 22 through an arc of approximately 90° incident to certain uses of the device as will be later described in detail. The rod 22 at the end thereof exteriorly of the case is provided with a head portion 31 and within the case it terminates in the tangentially extending finger 21 adapted on rotation of the rod to either engage the notch formed by the finger 20 or a notch 32 in one end of the reciprocable rack 25 as the bushing 27 is moved to its opposite extremes of movement.

The base member 3 includes a centrally disposed longitudinally extending clearance groove 33 for movement of the rods 12 and 22 and extending along one side of the groove is a flat surface 34 extending between the adjacent edge of the groove 33 and the inner wall surface 35; said flat surface and wall surface combining with the leaf element 23 to form a guideway for the reciprocable rack 25. The opposite side of the inner surface of the base member is provided with a corresponding and oppositely disposed flat surface 36 at the mid length of which a stationary rack 37 meshing with the pinion 16 is mounted.

The operation of the above described portion of the device is as follows: Referring first to Figs. 3, 4 and 7, the rod 22 has been turned by the bushing 26 so that the finger 21 engages the notch 32 in the rack 25. As the rod 12 is moved to the left, the engagement between the pinion 16 and the stationary rack 37 will cause the pinion to rotate in a counterclockwise direction carrying the rack 25 with it at twice the extent of linear movement of the rod 12 and since the rod 22 is locked to the rack 25 it will move to the same extent as the rack 25. Conversely, movement of the rod 22 to the right will move the rod 12 to half the extent of the movement of the rod 22.

Referring next to Fig. 5, the rod 22 has been turned so that the finger 21 releases the rack 25 and instead engages the slot formed by the finger 20 on the end of the rod 12. The two rods are now locked together for coincident movement and incident to such movement, the rack 25 travels from end to end in the interior of the case in an idle movement.

The device also includes means for optionally spring biasing the movement of the rods in either direction in each of the above described interconnections between them. The spring biasing means illustrated included a longitudinally disposed bore 38 extending from the end of the base member 3 carrying the end member 7 to a point adjacent the opposite end of the base member 3 and located between the bottom of the groove 33 and the back 4 of the base 3. A compression spring 39 is freely mounted in the bore 38 together with end plugs 40 and 41 having, respectively, circumferential grooves 42 and 43 thereon for engagement by set screws 44 and 45 threaded into the side of the base member. A slot 46, longitudinally co-extensive with the bore 38 extends between the bore 38 and the bottom of the groove 33 and the rod 12 at about the midpoint of its length within the base member when fully moved to the left as shown in Fig. 6, carries a pin 47 extending through the slot 46 into the path of movement of the end plug 40. The rod 12 also carries at its innermost end a finger element 48 extending beyond the rod 12 and in the slot 46 and terminating in a distal end 49 projecting into the bore 38 and into the path of movement of the end plug 41.

When it is desired to arrange the spring to effect a bias toward the right or as shown in Fig. 6, the end plug 41 is secured by the set screw 45 as shown in Fig. 8 and the end plug 40 is left free to move. As thus arranged, the spring exerts a constant bias to move the rod 12 to the right carrying the rod 22 with it either in a 1:1 ratio or at a 2:1 ratio as the rod 22 may be adjusted. When it is desired to reverse the bias of the spring, the rod 12 is moved to the left as far as it will go, compressing the spring and bringing the end plug 40 in such position that the groove 42 therein is opposite the set screw 44. The set screw 44 is then tightened to hold the end plug 40 in fixed position and the set screw 45 is unscrewed to allow the compressed spring to move the end plug 41 into engagement with the finger 49 thus applying spring bias in the opposite direction. To return to the first spring condition, the rods are moved to fully compress the spring as before, the screw 45 is tightened to secure the end plug 41 and then the set screw 44 is unscrewed to release the end plug 40 and the opposite end of the spring.

Mounting of the device may be of any convenient construction; the illustrated form being the provision of a threaded stud 50 on the back of the base 3 adapted to be secured to the bracket B by a nut 51.

Referring again to Fig. 1 the device is shown arranged so that the rod 22 will move the indicator at twice the rate of movement of the lathe carriage to the left. This affords great accuracy in performing an operation in which that movement is critical. By moving the carriage to the right to an extent that will allow the rods to move to the right to the full extent permitted by the device, the rods are in the position shown in Fig. 3 in which position the rod 22 can be rotated to change the ratio of movement as described. For other operations, the device may be installed with the rod 22 at the left and the spring bias reversed to give a 1:2 or a 1:1 ratio of movement between the rods. The use of the device is not confined to the illustrated installation and it may be installed, for example on the tool slide or on other machine tools where the extent of movement between relatively moving parts must be observed with extreme accuracy. The use of the device permits work to closer tolerances on many machines on which the usual graduations on the tool directing elements are either too close to be read with accuracy or are too coarse for use on high precision operations and thus contributes materially to the usefulness of the machines to which it is applied. Even where the work is such as to be within the range of tolerance for a given machine, the use of the device permits operations to exact limits with greater speed due to the ease of reading the indicator dial.

While the foregoing specification discloses one embodiment of the invention, it is appreciated that changes will suggest themselves to those skilled in the art. Therefore the invention shall not be deemed to be limited to the exact embodiment disclosed and it will be understood to include as well all such changes and modifications in the parts and in the construction, combination and arrangement of parts as shall come within the purview of the appended claims.

We claim:

1. In an indicator actuator adapted to be mounted on a machine tool between an indicator feeler element and a part of the machine movable toward and away from the feeler element an elongated hollow case having external means for mounting said case on a machine tool in fixed position relative to an indicator mounted on the machine tool, a pair of rods extending longitudinally of said case and disposed in axial alignment with each other; one of said rods being mounted for reciprocation in one end wall of said case and extending therethrough from the interior of said case toward the feeler element of the indicator, and the other of said rods being mounted for reciprocation in the other end wall of said case and extending from the interior of said case toward the movable portion of the machine tool to be contacted thereby, spring means within said case for biasing said rods for simultaneous longitudinal movement in the same direction, means extending to the exterior of said case selectively operable to cause said spring means to bias said rods for said simultaneous movement in either longitudinal direction, means within said case for interconnecting said rods including devices for translating the longitudinal movement of one of said rods into a movement of the other of said rods in the same direction which is double the linear extent of movement of said one rod, other means within said case for interconnecting said rods for movement in the same direction in unison and to the same extent, and means exteriorly of said case operable selectively to effect the engagement of either of said connecting means and the simultaneous disengagement of the other of said connecting means.

2. In an indicator actuator adapted to be mounted on a machine tool between an indicator feeler element and a part of the machine movable toward and away from the feeler element; an elongated hollow case having external means for mounting said case on a machine tool in fixed position relative to an indicator mounted on the machine tool, a pair of rods extending longitudinally of said case and disposed in axial alignment with each other; one of said rods being mounted for reciprocation in one end wall of said case and extending therethrough from the interior of said case toward the feeler element of the indicator, and the other of said rods being mounted for reciprocation in the other end wall of said case and extending from the interior of said case toward the movable portion of the machine tool to be contacted thereby, spring means within said case for biasing said rods for simultaneous longitudinal movement in the same direction, means extending to the exterior of said case selectively operable to cause said spring means to bias said rods for said simultaneous movement in either longitudinal direction, means within said case for interconnecting said rods including devices for translating the longitudinal movement of one of said rods into a movement of the other of said rods in the same direction which is double the linear extent of movement of said one rod, other means within said case for interconnecting said rods for movement in the same direction in unison and to the same extent, and means exteriorly of said case operable selectively to effect the engagement of either of said connecting means and the simultaneous disengagement of the other of said connecting means; said last named means comprising a bushing providing guidance for one of said rods mounted in one of said end walls for oscillation about the axis of the rod guided therein, interengaging means between said rod and said bushing preventing relative rotary movement therebetween while permitting reciprocation of said rod, and means on said rod within said case engageable either with said first named connecting means or the other of said rods as said bushing is moved in said end wall from one extreme of its oscillatory movement to the other extreme thereof.

3. In an indicator actuator adapted to be mounted on a machine tool between an indicator feeler element and a part of the machine movable toward and away from the feeler element; an elongated hollow case having external means for mounting said case on a machine tool in fixed position relative to an indicator mounted on the machine tool, a pair of rods extending longitudinally of said case and disposed in axial alignment with each other; one of said rods being mounted for reciprocation in one end wall of said case and extending therethrough from the interior of said case toward the feeler element of the indicator, and the other of said rods being mounted for reciprocation in the other end wall of said case and extending from the interior of said case toward the movable portion of the machine tool to be contacted thereby, spring means within said case for biasing said rods for simultaneous longitudinal movement in the same direction, means extending to the exterior of said case selectively operable to cause said spring means to bias said rods for said simultaneous movement in either longitudinal direction, means within said case for interconnecting said rods including devices for translating the longitudinal movement of one of said rods into a movement of the other of said rods in the same direction which is double the linear extent of movement of said one rod, other means within said case for interconnecting said rods for movement in the same direction in unison and to the same extent, and means exteriorly of said case operable selectively to effect the engagement of either of said connecting means and the simultaneous disengagement of the other of said connecting means; said movement translating means comprising a pinion mounted on one of said rods within said case for rotation about an axis normal to the axis of said rod, a rack mounted fixedly within said case meshing with the teeth of said pinion, a second rack slidably mounted in said case and meshing with said pinion opposite the point of engagement with said fixed rack, and means for connecting and disconnecting said sliding rack and the other of said rods.

4. In an indicator actuator adapted to be mounted on a machine tool between an indicator feeler element and a part of the machine movable toward and away from the feeler element; an elongated hollow case having external means for mounting said case on a machine tool in fixed position relative to an indicator mounted on the machine tool, a pair of rods extending longitudinally of said case and disposed in axial alignment with each other; one of said rods being mounted for reciprocation in one end wall of said case and extending therethrough from the interior of said case toward the feeler element of the indicator, and the other of said rods being mounted for reciprocation in the other end wall of said case and extending from the interior of said case toward the movable portion of the machine tool to be contacted thereby, spring means within said case for biasing said rods for simultaneous longitudinal movement in the same direction, means extending to the exterior of said case selectively operable to cause said spring means to bias said rods for said simultaneous movement in either longitudinal direction, means within said case for interconnecting said rods including devices for translating the longitudinal movement of one of said rods into a movement of the other of said rods in the same direction which is double the linear extent of movement of said one rod, other means within said case for interconnecting said rods for movement in the same direction in unison and to the same extent, and means exteriorly of said case operable selectively to effect the engagement of either of said connecting means and the simultaneous disengagement of the other of said connecting means; said spring means including a bore extending longitudinally of said case from one end thereof to a point adjacent the opposite end of said case, a compression spring in said bore, a pair of abutment plugs slidably mounted in said bore and engaging the opposite ends of said spring, a pair of set screws each engageable with one of said plugs and operable to hold one of said plugs in fixed position and release the other of said plugs, and a pair of abutment members carried by one of said rods disposed in the paths of movement of said plugs and effective to transmit the released energy of said spring to said rod.

5. In an indicator actuator adapted to be mounted on a machine tool between an indicator feeler element and a part of the machine movable toward and away from the feeler element; an elongated hollow case having external means for mounting said case on a machine tool in fixed position relative to an indicator mounted on the machine tool, a pair of rods extending longitudinally of said case and disposed in axial alignment with each other; one of said rods being mounted for reciprocation in one end wall of said case and extending therethrough from the interior of said case toward the feeler element of the indicator, and the other of said rods being mounted for reciprocation in the other end wall of said case and extending from the interior of said case toward the movable portion of the machine tool to be contacted thereby, spring means within said case for biasing said rods for simultaneous longitudinal movement in the same direction, said spring means including a bore extending longitudinally of said case from one end thereof to a point adjacent the opposite end of said case, a compression spring in said bore, a pair of abutment plugs slidably mounted in said bore and engaging the opposite ends of said spring, a pair of set screws each engageable with one of said plugs and operable to hold one of said plugs in fixed position and release the other of said plugs, and a pair of abutment members carried by one of said rods disposed in the paths of movement of said plugs and effective to transmit the released energy of said spring to said rod, means within said case of interconnecting said rods including devices for translating the longitudinal movement of one of said rods in a movement of the other of said rods in the same direction which is double the linear extent of movement of said one rod, other means within said case for interconnecting said rods for movement in the same direction in unison and to the same extent, and means exteriorly of said case operable selectively to effect the engagement of either of said connecting means and the simultaneous disengagement of the other of said connecting means; said last named means comprising a bushing providing guidance for one of said rods mounted in one of said end walls for oscillation about the axis of the rod guided therein, interengaging means between said rod and said bushing preventing relative rotary movement therebetween while permitting reciprocation of said rod, and means on said rod within said case engageable either with said first named connecting means or the other of said rods as said bushing is moved in said end wall from one extreme of its oscillatory movement to the other extreme thereof.

6. In an indicator actuator adapted to be mounted on a machine tool between an indicator feeler element and a part of the machine movable toward and away from the feeler element; an elongated hollow case having external means for mounting said case on a machine tool in fixed position relative to an indicator mounted on the machine tool, a pair of rods extending longitudinally of said case and disposed in axial alignment with each other; one of said rods being mounted for reciprocation in one end wall of said case and extending therethrough from the interior of said case toward the feeler element of the indicator, and the other of said rods being mounted for reciprocation in the other end wall of said case and extending from the interior of said case toward the movable portion of the machine tool to be contacted thereby, spring means within said case for biasing said rods for simultaneous longitudinal movement in the same direction, said spring means including a bore extending longitudinally of said case from one end thereof to a point adjacent the opposite end of said case, a compression spring in said bore, a pair of abutment plugs slidably mounted in said bore and engaging the opposite ends of said spring, a pair of set screws each engageable with one of said plugs and operable to hold one of said plugs in fixed position and release the other of said plugs, and a pair of abutment members carried by one of said rods disposed in the paths of movement of said plugs and effective to transmit the released energy of said spring to said rod, means within said case for interconnecting said rods including devices for translating the longitudinal movement of one of said rods into a movement of the other of said rods in the same direction which is double the linear extent of movement of said one rod, other means within said case for interconnecting said rods for movement in the same direction in unison and to the same extent, and means exteriorly of said case operable selectively to effect the engagement of either of said connecting means and the simultaneous disengagement of the other of said connecting means; said last named means comprising a bushing providing guidance for one of said rods mounted in one of said end walls for oscillation about the axis of the rod guided therein, interengaging means between said rod and said bushing preventing relative rotary movement therebetween while permitting reciprocation of said rod, and means on said rod within said case engageable either with said first named connecting means or the other of said rods as said bushing is moved in said end wall from one extreme of its oscillatory movement to the other extreme thereof; said movement translating means comprising a pinion mounted on one of said rods within said case for rotation about an axis normal to the axis of said rod, a rack mounted fixedly within said case meshing with the teeth of said pinion, a second rack slidably mounted in said case and meshing with said pinion opposite the point of engagement with said fixed rack, and means for connecting and disconnecting said sliding rack and the other of said rods.

7. In an indicator actuator adapted to be mounted on a machine tool between an indicator feeler element and a part of the machine movable toward and away from the feeler element; an elongated hollow case having external means for mounting said case on a machine tool in fixed position relative to an indicator mounted on the machine tool, a pair of rods extending longitudinally of said case and disposed in axial alignment with each other; one of said rods being mounted for reciprocation in the other end wall of said case and extending from the interior of said case toward the movable portion of the machine tool to be contacted thereby, spring means within said case for biasing said rods for simultaneous longitudinal movement in the same direction, means extending to the exterior of said case selectively operable to cause said spring means to bias said rods for said simultaneous movement in either longitudinal direction, means within said case for interconnecting said rods including devices for translating the longitudinal movement of one of said rods into a movement of the other of said rods in the same direction which is double the linear extent of movement of said one rod including a rack fixed to and extending longitudinally of said case, a pinion rotatably mounted on the other of said rods and meshing with said rack, and a rack slidably mounted on said case and meshing with said pinion at a point diametrically opposite the point of meshing of said pinion with said fixed rack, other means within said case for interconnecting said rods for movement in the same direction in unison and to the same extent, and means exteriorly of said case operable selectively to effect the engagement of either of said connecting means and the simultaneous disengagement of the other of said connecting means; said last named means comprising a bushing providing guidance for one of said rods mounted in one of said end walls for oscillation about the axis of the rod guided therein, interengaging means between said rod and said bushing preventing relative rotary movement therebetween while permitting reciprocation of said rod, the end of said rod carried by said bushing disposed within said case having a laterally extending finger and said slidable rack having a notch formed therein for reception of said finger incident to movement of said bushing and said rod to one extreme of its oscillatory movement with resultant interlocking of the rod and rack for movement in unison.

8. In an indicator actuator adapted to be mounted on a machine tool between an indicator feeler element and a part of the machine movable toward and away from the feeler element; an elongated hollow case having external means for mounting said case on a machine tool in fixed position relative to an indicator mounted on the machine tool, a pair of rods extending longitudinally of said case and disposed in axial alignment with each other; one of said rods being mounted for reciprocation in one end wall of said case and extending therethrough from the interior of said case toward the feeler element of the indicator, and the other of said rods being mounted for reciprocation in the other end wall of said case and extending from the interior of said case toward the movable portion of the machine tool to be contacted thereby, spring means within said case for biasing said rods for simultaneous longitudinal movement in the same direction, means extending to the exterior of said case selectively operable to cause said spring means to bias said rods for said simultaneous movement in either longitudinal direction, means within said case for interconnecting said rods including devices for translating the longitudinal movement of one of said rods into a movement of the other of said rods in the same direction which is double the linear extent of movement of said one rod including a rack fixed to and extending longitudinally of said case, a pinion rotatably mounted on the other of said rods and meshing with said rack, and a rack slidably mounted on said case and meshing with said pinion at a point diametrically opposite the point of meshing of said pinion with said fixed rack, other means within said case for interconnecting said rods for movement in the same direction in unison and to the same extent, and means exteriorly of said case operable selectively to effect the engagement of either of said connecting means and the simultaneous disengagement of the other of said connecting means; said last named means comprising a bushing providing guidance for one of said rods mounted in one of said end walls for oscillation about the axis of the rod guided therein, interengaging means between said rod and said bushing preventing relative rotary movement therebetween while permitting reciprocation of said rod, the end of said rod carried by said bushing disposed within said case having a laterally extending finger and said slidable rack having a notch formed therein for reception of said finger incident to movement of said bushing and said rod to one extreme of its oscillatory movement with resultant interlocking of the rod and rack for movement in unison and said carrying said pinion at the end thereof within said case having a notch engageable by said finger when said bushing and the rod carried thereby are moved to the other extreme of said oscillatory movement with resultant interlocking of said rods for movement in unison and to identical linear extent.

9. In an indicator actuator adapted to be mounted on a machine tool between an indicator feeler element and a part of the machine movable toward and away from the feeler element; an elongated hollow case having external means for mounting said case on a machine tool in fixed position relative to an indicator mounted on the machine tool, a pair of rods extending longitudinally of said case and disposed in axial alignment with each other; one of said rods being mounted for reciprocation in one end wall of said case and extending therethrough from the interior of said case toward the feeler element of the indicator, and the other of said rods being mounted for reciprocation in the other end wall of said case and extending from the interior of said case toward the moveable portion of the machine tool to be contacted thereby, spring means within said case for biasing said rods for simultaneous longitudinal movement in the same direction, means extending to the exterior of said case selectively operable to cause said spring means to bias said rods for said simultaneous movement in either longitudinal direction, means within said case for interconnecting said rods including devices for translating the longitudinal movement of one of said rods into a movement of the other of said rods in the same direction which is double the linear extent of movement of said one rod including a rack fixed to and extending longitudinally of said case, a pinion rotatably mounted on the other of said rods and meshing with said rack, and a rack slidably mounted on said case and meshing with said pinion at a point diametrically opposite the point of meshing of said pinion with said fixed rack, other means within said case for interconnecting said rods for movement in the same direction in unison and to the same extent, and means exteriorly of said case operable selectively to effect the engagement of either of said connecting means and the simultaneous disengagement of the other of said connecting means; said last named means comprising a bushing providing guidance for one of said rods mounted in one of said end walls for oscillation about the axis of the rod guided therein, interengaging means between said rod and said bushing preventing relative rotary movement therebetween while permitting reciprocation of said rod, the end of said rod carried by said bushing disposed within said case having a laterally extending finger and said slidable rack having a notch formed therein for reception of said finger incident to movement of said bushing and said rod to one extreme of its oscillatory movement with resultant interlocking of the rod and rack for movement in unison and said rod carrying said pinion at the end thereof within said case having a notch engageable by said finger when said bushing and the rod carried thereby are moved to the other extreme of said oscillatory movement with resultant interlocking of said rods for movement in unison and to identical linear extent; said spring means including a bore extending longitudinally of said case from one end thereof to a point adjacent the opposite end of said case, a compression spring in said bore, a pair of abutment plugs slidably mounted in said bore and engaging the opposite ends of said spring, a pair of set screws each engageable with one of said plugs and operable to hold one of said plugs in fixed position and release the other of said plugs, and a pair of abutment members carried by said rod carrying said pinion disposed in the paths of movement of said plugs and effective to transmit the released energy of said spring to said rod.

References Cited in the file of this patent

UNITED STATES PATENTS

| 2,505,381 | Breguet | Apr. 25, 1950 |
| 2,525,805 | Kirkpatrick | Oct. 17, 1950 |

FOREIGN PATENTS

| 488,223 | Germany | Dec. 23, 1929 |